United States Patent [19]

Lee

[11] Patent Number: 4,688,615
[45] Date of Patent: Aug. 25, 1987

[54] REINFORCING STRUCTURE FOR A RUBBER ARTICLE

[75] Inventor: Byung-Lip Lee, Akron, Ohio

[73] Assignee: The Goodyear Tire & Rubber Company, Akron, Ohio

[21] Appl. No.: 738,626

[22] Filed: May 28, 1985

[51] Int. Cl.$^4$ .................. B60C 9/20; B32B 5/12; B65G 15/34; F16G 1/10

[52] U.S. Cl. .................. 152/531; 152/535; 198/847; 428/110; 474/261

[58] Field of Search .............. 152/526, 531, 535, 536, 152/527, 187, 175; 474/261, 262; 198/847; 428/110, 114, 112, 105

[56] References Cited

U.S. PATENT DOCUMENTS

| | | |
|---|---|---|
| 1,689,119 | 10/1928 | Evans . |
| 2,826,233 | 3/1958 | Cooper . |
| 3,503,432 | 3/1970 | Maiocchi .................. 152/16 |
| 3,504,724 | 4/1970 | Sperberg . |
| 3,557,858 | 1/1971 | Lugli .................. 152/187 |
| 3,620,279 | 11/1971 | Bartha et al. . |
| 3,667,527 | 6/1972 | Magistrini et al. .................. 152/187 |
| 3,703,202 | 11/1972 | Maiocchi .................. 152/175 |
| 4,103,055 | 6/1978 | Levy . |
| 4,244,415 | 1/1981 | Peter et al. . |
| 4,258,775 | 3/1981 | Samoto .................. 152/531 |
| 4,360,397 | 11/1982 | Caretta . |

FOREIGN PATENT DOCUMENTS 2110988 9/1971 Fed. Rep. of Germany ...... 152/531

Primary Examiner—Michael W. Ball
Attorney, Agent, or Firm—T. P. Lewandowski

[57] ABSTRACT

A reinforcing structure for a rubber article includes a first annular ply disposed in the article. The first ply has a cord construction and includes a plurality of parallel cords which are disposed at an angle with respect to the midcircumferential centerplane of the article. A second annular ply is disposed in the article and is spaced radially outwardly from the first ply. The second ply also has a cord construction and includes a plurality of parallel cords which are disposed at an angle with respect to the midcircumferential centerplane of the article in a direction opposite to the direction of the cords of the first ply. A third annular ply is disposed in the article and is positioned between the first and second plies and is bonded thereto. The third ply has a cord construction and includes a plurality of parallel cords which form a 0° angle with respect to the midcircumferential centerplane of the article. The cords of the third ply have a diameter no greater than the cords of the first and second plies.

24 Claims, 6 Drawing Figures

REINFORCING STRUCTURE FOR A RUBBER ARTICLE

This invention generally pertains to reinforcing structures for a rubber article. More specifically, the present invention relates to a three-ply reinforcing structure in which the central ply includes a plurality of cords which are disposed at a 0° angle with respect to the midcircumferential centerplane of the article.

The invention is particularly applicable to reinforcing structures for pneumatic tires and will be described with particular reference thereto. The invention could, however, be used for reinforcing other types of rubber articles, such as conveyor belts, power transmission belts and the like. It will also be appreciated by those skilled in the art that the invention has broader applications and may be adapted for use in other reinforcing environments as well.

It is conventional in pneumatic tires to provide one or more tread reinforcing belts underneath the tread of the tire. One conventional construction utilizes a pair of tread reinforcing belts or plies having equal and opposite cord angles with respect to a midcircumferential centerplane of the tire. As is well-known, when two plies with equal but opposite angles of cord reinforcement are bonded to each other in a reinforcing structure or laminate, the mechanical behavior of the individual plies is significantly altered because of the constraint dictated by interply bonding. Such laminates have been found particularly advantageous for vehicle tires.

It is conventional, for example, to utilize a belt structure having a +23°/−23° cord angle sequence in the two reinforcing plies. A test specimen of this structure may, however, under certain circumstances be prone to edge cracking and a delamination of the two plies from each other at their lateral edges which is termed "belt edge separation or delamination". Oppositely directed in plane shear stresses in the inner and outer belts will cause a test specimen of a cord-rubber composite from which a tire belt is made to fail in an interply shear fracture mode near the edges of the belts. A test specimen simulating a +23°/−23° reinforcing belt structure has been found to undergo belt edge delamination under both static and cyclic loading, such that the delamination is initiated by matrix/interface cracking around the individual cord ends at the belt edges. This is termed "edge cracking" or "socketing." Such cracks then propagate along the cord axis in the rubber matrix of the belt and eventually in the interply region between the belts.

For the purposes of this specification the threshold load is defined when a test specimen in a laboratory setting is taken to the limit at which such edge cracking or socketing beings. It is also conventional in tires to provide a carcass ply, having cords angled at 90° to the midcircumferential centerplane of the tire, adjacent the tread reinforcing belt structure. It has been found, however, that belt edge delamination is not altered by the constraint of a carcass ply provided adjacent thereto. In other words, a cord-rubber composite specimen which simulates belt plies bonded to a carcass ply (thus having a cord angle sequence of 90°/+23°/−23°) still may be prone to edge delamination between the upper and lower belt plies. When such a specimen fails, it is due to edge delamination which occurs between the upper and lower belt plies. However, in this case, there is a pronounced mismatch between the Poisson's ratios of the 90° carcass and the +23°/−23° belt plies resulting in a decrease of the load for socketing initiation in the belt plies thereby lowering the threshold level for the semi-infinite fatigue life of the cord-rubber composite.

In general, when a material is stretched, both its length and its cross-sectional area change. "Poisson's ratio" is defined as the constant relating these changes in dimensions, and is obtained by dividing the change in width per unit width by the change in length per unit length within the elastic limit of the material. With a 90°/+23°/−23° ply structure, there is a considerable mismatch of Poisson's ratios between the belt ply and carcass ply and thus a smaller load can under certain circumstances cause edge cracking of the belt plies than even the load necessary to cause edge cracking in the +23°/−23° ply structure.

Accordingly, it has been considered desirable to develop a new and improved reinforcing structure for a rubber article which would overcome the foregoing difficulties and others while providing better and more advantageous overall results.

In accordance with the present invention, a new and improved reinforcing structure for a rubber article is provided.

More particularly in accordance with the invention, the reinforcing structure includes a first annular ply disposed in the article with the first ply including a plurality of parallel cords. The cords of the first ply are disposed at an angle with respect to the midcircumferential centerplane of the article. A second annular ply is disposed in the article and is spaced radially outwardly from the first ply. The second ply also includes a plurality of parallel cords which are disposed at an angle with respect to the midcircumferential centerplane of the article in a direction opposite to the direction of the cords of the first ply. A third annular ply is disposed in the article, is positioned between the first and second plies and is bonded thereto. The third ply includes a plurality of parallel cords which form a 0° angle with respect to the midcircumferential centerplane of the article. The third ply cords have a diameter no greater than the diameters of the first second ply cords.

In accordance with another aspect of the invention, a new and improved pneumatic tire is provided.

More particularly in accordance with this aspect of the invention, the pneumatic tire includes a tread portion and a pair of integral sidewalls. A tread reinforcing structure is positioned in the tire underneath the tread portion. The reinforcing structure includes a first annular belt reinforcement member which has a cord construction such that a plurality of spaced adjacent cords thereof are parallel to each other and are disposed at an angle of $+\alpha$ degrees with respect to a midcircumferential centerplane of the tire. The structure includes a second belt reinforcement member which is positioned radially outwardly of the first belt. The second belt has a cord construction such that a plurality of spaced adjacent cords thereof are parallel to each other and are disposed at an angle of $-\alpha$ degrees with respect to the midcircumferential centerplane of the tire. The structure further includes a third belt reinforcement member which is positioned between the first and second belts and is bonded thereto. The third belt has a cord construction such that a plurality of spaced adjacent cords thereof are parallel to each other and are disposed at an angle of 0° with respect to the midcircumferential center-plane of the tire. The cords of the third belt are made from a material having a lower tensile strength than the material from which the cords of the first and second belts are made. The third ply minimizes problems of edge cracking and belt edge separation. The third ply also increases the fatigue resistance of the reinforcing structure.

According to another aspect of the invention, a new and improved reinforcing structure for a rubber article is provided.

In accordance with this aspect of the invention, the reinforcing structure includes a first annular belt reinforcement member disposed in the article with the first belt having a cord construction. A plurality of spaced parallel cords in the belt are disposed at an angle of between +5 and +60 degrees with respect to a midcircumferential centerplane of the article. A second annular belt reinforcement member is also disposed in the article and is positioned radially outwardly of the first belt. The second belt also has a cord construction with a plurality of spaced parallel cords therein which are disposed at an angle of between −5 and −60 degrees with respect to the midcircumferential centerplane of the article. The second belt cords are disposed at the same angle as, but in an opposite direction from, the first belt cords. A third annular reinforcement member is also disposed in the article and is positioned between the first and second belt members and is bonded thereto. The third belt member has a cord construction in which a plurality of spaced parallel cords are disposed at an angle of 0° with respect to the midcircumferential centerplane of the article. The cords of the third belt are made from a material having a lower tensile strength than the material from which the cords of the first and second belt members are made. The third belt member cooperates with the first and second belt members to increase the fatigue resistance of the reinforcing structure.

It is known that some manufacturers have produced tread rings for removable tread tires which have utilized a series of stacked plies having a cord angle sequence of $+\alpha°/0°/-\alpha°$ to the midcircumferential centerplane of the tire. However, in this kind of a ply structure, the 0° center ply is known as the "armor" layer and is made of a thick, very stiff single helically wound metal cord. In contrast, the outer and inner plies are made of thinner cords of material which have a considerably lower tensile strength than the armor layer. The 0° ply or "tension resistance armor" has the task of withstanding expansion of the carcass in order to produce the friction forces which secure the tread ring on the carcass, and the other plies provide only transverse rigidity to the tire tread.

However, in the reinforcing structure of the present invention, the 0° middle ply does not take the majority of the load. While the middle ply may have the same tensile strength as the outer and inner plies, it preferably has a lower tensile strength, i.e. is more extensible than and not as stiff as, the outer and inner plies. The function of the middle ply is to reinforce the interply region between the outer and inner plies thus increasing the fatigue life of the structure. Also, the cords of the middle ply preferably have a diameter no greater than the cords of the inner and outer plies since it is undesirable to make the entire belt package too thick.

An advantage of the present invention is the provision of a new reinforcing structure, composed of a plurality of bonded adjacent plies, for a rubber article. Such a new structure improves the fatigue life of the article as a whole since the reinforcing structure has minimized the parameters that lead to edge cracking and subsequent delamination of the plies from each other, which would tend to weaken the article.

Another advantage of the invention is the provision of a reinforcing structure made of three bonded adjacent plies which are each formed of a plurality of parallel cords. The cords of the three plies are angled at $+\alpha°/0°/-\alpha°$ to the midcircumferential centerplane of the article. This sequence of plies has been found to reduce strain gradients near the lateral edges of the structure.

Still another advantage of the invention is the provision of a three-ply reinforcing structure for a tire having a carcass ply adjacent the reinforcing structure with the carcass ply cords being angled at approximately 90° to the midcircumferential centerplane of the tire. A ply stacking sequence of $90°/+\alpha°/0°/-\alpha°$ is provided by the present invention and this enables adjacent plies to have relatively close values of Poisson's ratio. The value of $\alpha°$ may range from 5° to 60° and can be, for example, 23° or 45°.

A yet further advantage of the invention is the provision of a three ply reinforcing structure which, due to its construction, has a strengthened interply region between the outer and inner plies. In other words, the cords of the inner and outer plies are each positioned in a rubber matrix so a thin rubber region is located between the oppositely angled cords of the inner and outer plies. This region is strengthened since it is interlaced by the cords of the middle ply.

Still other benefits and advantages of the invention will become apparent to those skilled in the art upon a reading and understanding of the following detailed specification.

The invention may take physical form in certain parts and arrangements of parts, preferred embodiments of which will be described in detail in this specification and illustrated in the accompanying drawings which form a part hereof, and wherein.

Figure 5:
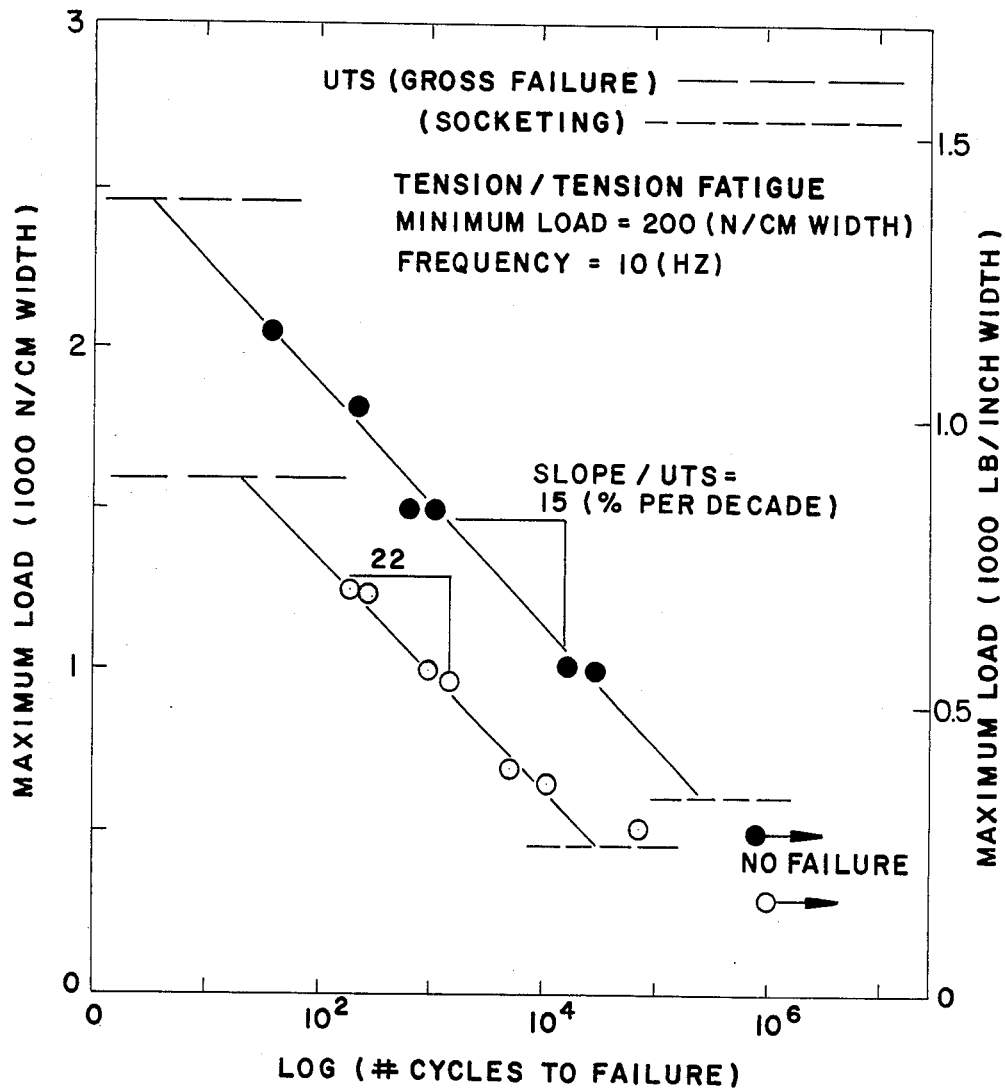
Figure 6:
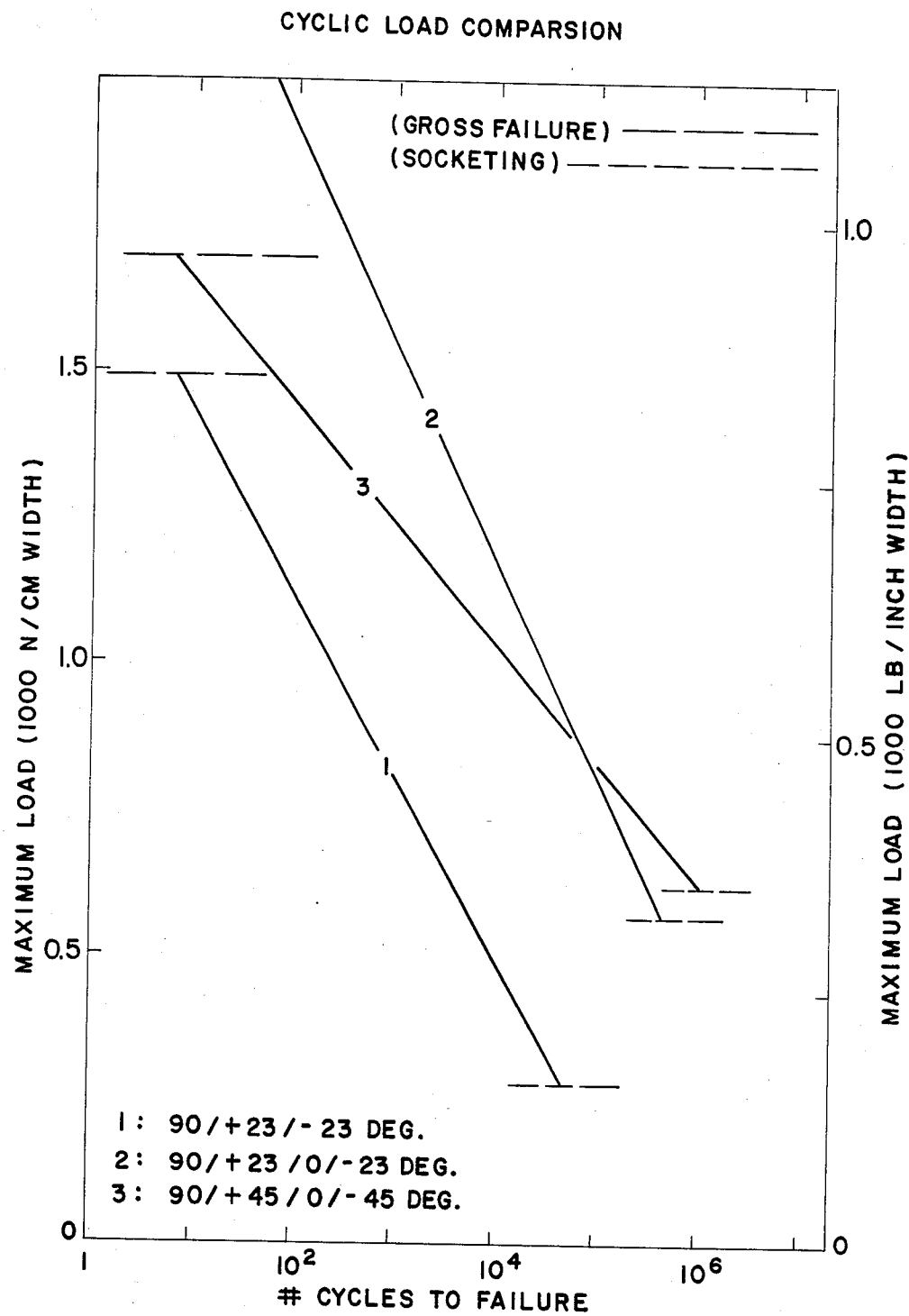

FIG. 5 is a cyclic load diagram with maximum load along the vertical axis and number of cycles to failure along the horizontal axis for a conventional reinforcing structure and a reinforcing structure according to the present invention; and, FIG. 6 is a cyclic load comparison showing maximum load along the vertical axis and number of cycles to failure along the horizontal axis for a prior art reinforcing structure and two reinforcing structures according to the present invention.

Figure 1:
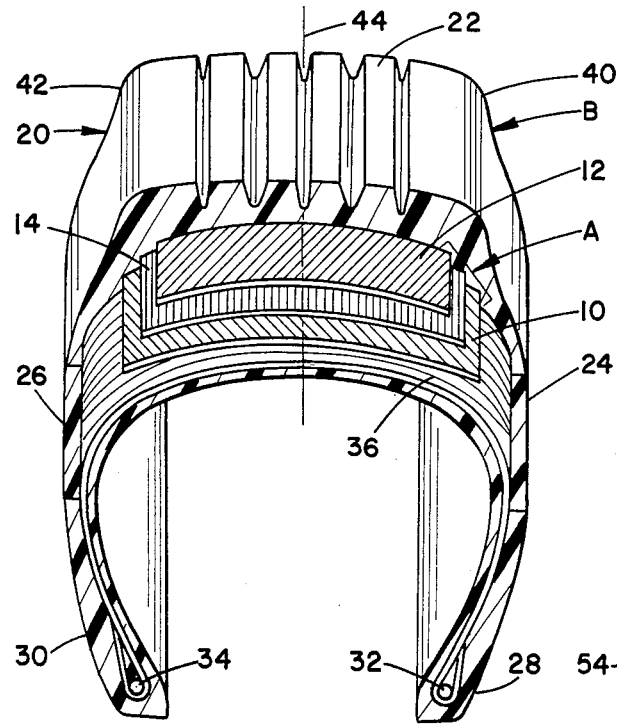
FIG. 1 is a cross-sectional view, with parts broken away, of a tire provided with the reinforcing structure of the present invention.

Referring now to the drawings, wherein the showings are for purposes of illustrating preferred embodiments of the invention only and not for purposes of limiting same, FIG. 1 shows the subject new reinforcing structure for rubber articles. While the reinforcing structure is primarily designed for and will hereinafter be described as reinforcing either a tire or a belt, such as a conveyor belt or a power transmission belt, it will be appreciated that the overall inventive concept involved could be adapted for use in other reinforcing environments as well.

More particularly, FIG. 1 discloses the reinforcing structure A as used in a tire B. The reinforcing structure includes a first belt or ply 10, a second belt 12, and a third or middle belt 14 positioned between the first and second belts. These belts are bonded to each other and are positioned in the tire's body 20. The tire body includes a tread portion 22 from each of the lateral edges of which extends a respective sidewall 24, 26. Each sidewall has at its free edge a respective bead portion 28, 30 with a respective bead wire 32, 34 extending in each of the bead portions. A carcass ply 36 extends from one bead 28 to the other bead 30 through the pair of sidewalls 24, 26 and underneath the tread portion 22. The reinforcing structure A is positioned above the carcass ply 36 and below the tread portion 22 and generally serves to reinforce the tread.

The three reinforcing belts 10, 12, 14, are all disposed circumferentially in the tire body 20 and can extend approximately from one lateral edge 40 of the tread to the opposing lateral edge 42. Of course, wider or narrower belt widths are also feasible. The first belt 10 is positioned radially inwardly of the second belt 12 and the third belt 14, as mentioned, is positioned between the first and second belts and is bonded to these belts to form the reinforcing structure A. For the purposes of this specification, "radially" means transversely to the rotational axis of the tire. Frequently, the first or inner belt 10 is somewhat wider than the second or outer belt 12 and if this type of construction is used, the third or middle belt 14 can have a width intermediate between the first and second belts as is illustrated in FIG. 1. Of course, the middle belt and either one of the first and second belts can also be of the same width if desired. The three belts 10, 12, 14 can have the same thickness, if desired, or the third belt can be somewhat thinner than the first and second belts. Of course, for some applications, a third belt thicker than the first and second belts could also be employed.

It is estimated that a tire when inflated will stretch the reinforcing structure A thereof by less than approximately 2%. As mentioned, the resistance to such stretching will be provided primarily by the outer and inner belts 10, 12 and not by the middle belt 14 since the cords of the middle belt are preferably made of a less strong and softer material than the cords of the inner and outer belts 10, 12.

All three of the belts 10, 12, 14 have a cord construction in which a plurality of cords are disposed in a spaced parallel relationship with each other. The cords of the inner belt 10 are disposed at an angle of $+\alpha°$ with respect to a midcircumferential centerplane 44 of the tire. The cords of the outer belt 12 are in a crossing relationship thereto and are disposed at an angle of $-\alpha°$ with respect to the midcircumferential centerplane of the tire. In other words, the inner belt cords are disposed at the same angle as, but in an opposite direction from, the outer belt cords. Preferably, the cords of the outer and inner belts 10, 12 are disposed at angles which can range between 5° and 60° with respect to the midcircumferential centerplane 44 of the tire B.

As mentioned, the third or middle belt 14 also has a cord construction, but the cords of this belt are disposed at an angle of substantially 0° with respect to the midcircumferential centerplane 44 of the tire. It has been discovered that when three such plies or belts are bonded together, the reinforcing structure so formed has minimized the parameters leading to edge crack initiation and ply edge delamination or separation. Also, such a construction has been found to increase the fatigue lifetime and fatigue resistance of the reinforcing structures.

The middle ply or belt has been found to reduce the strain gradients near the edges of the laminate or reinforcing structure A caused by oppositely directed in-plane shear stresses in the inner and outer belts.

In general, the load for "socketing" initiation constitutes a threshold level for the semi-infinite fatigue life of a cord-rubber composite or reinforcing structure A. Thus, when the maximum stress during cyclic loading of such a structure does not exceed the critical load for socketing, the cord-rubber composite exhibits no damage and has a virtually infinite fatigue life. As is evident, therefore, when the critical load for socketing is not exceeded in the tread reinforcing belt structure A, the tire B will last considerably longer since its reinforcing belts better resist the stresses they are prone to when loaded.

Figure 3:
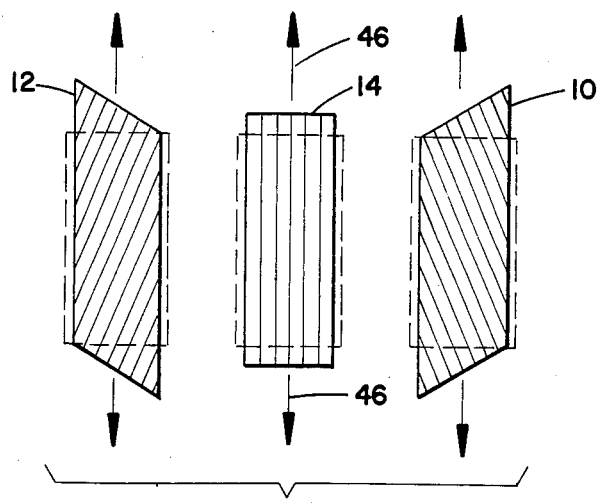
FIG. 3 is a schematic exploded plan view of the three plies of the reinforcing structure of the present invention in both a loaded, as shown in solid lines, and an unloaded state, as shown in dotted lines.

With reference now to FIG. 3, under a uniaxial tension as indicated by the arrows 46, the middle belt 14, as shown in solid lines, has a relatively uniform deformation capability across its width and exhibits no excessive mismatch of Poisson's ratio against the upper and lower belts 10, 12 as long as their cord angles are less than 60°. By tailoring the modulus and strength of the reinforcing cords of the middle belt 14, the interply region between the outer and inner belts 10, 12 can be strengthened, at least to some extent.

The inclusion of a middle belt 14 having a cord construction forming a 0° angle with respect to the midcircumferential centerplane 44 of the tire gives a higher threshold load thereby elevating the threshold level for the semi-infinite fatigue life of a test specimen of the cord-rubber composite laminate or reinforcing structure A. Also, at any given maximum stress above the threshold load, the presence of the 0° middle belt 14 results in a considerable increase in the fatigue lifetime of the structure A.

Figure 4:
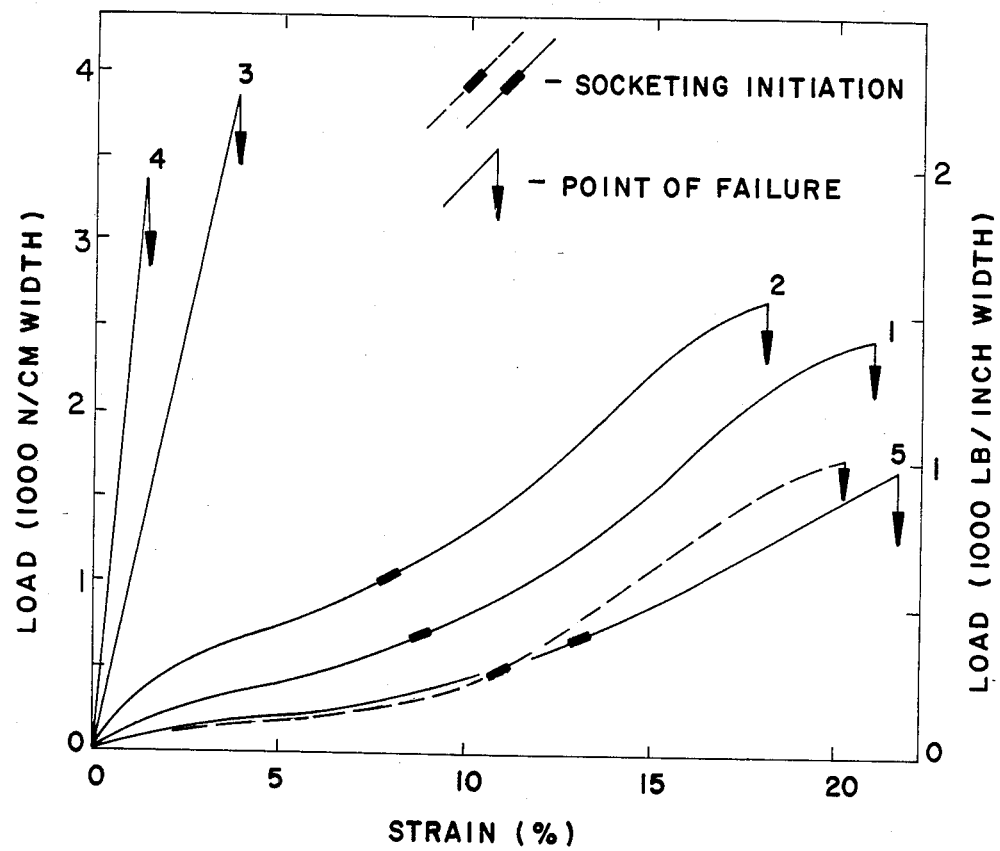
FIG. 4 is a static load diagram showing load on the vertical axis and strain on the horizontal axis for a prior art reinforcing structure and five embodiments of a reinforcing structure according to the present invention.

With reference now to the static load diagram in FIG. 4, it can be seen that the threshold load is lower in a test specimen of a conventional +23°/−23° ply structure (shown in dotted lines) than in the several three-ply test specimen structures according to the present invention (shown in solid lines). Moreover, the point of failure also occurs at a relatively lower load in such a conventional two-ply test specimen structure than in a +23°/0°/−23° three-ply test specimen structure according to the present invention.

A number of different materials have been tried for the middle ply or belt 14 of the reinforcing structure A. As is evident from FIG. 4, these materials include nylon cord, PET cord (polyethelene terpthalate), aramid cord (aromatic polyamide), and wire strand. Of these materials it can be seen that nylon cord will take the highest strain, i.e. undergo the highest percentage of elongation before failure. PET cord will take somewhat less strain before its failure point and aramid cord and steel cord will take considerably less strain than either the nylon cord or the PET cord.

Under static tension, the use of the 0° middle ply or belt 14 with nylon or PET cords (graphs 1 and 2) results in anywhere from a 40% to a two-fold increase in the threshold load in a test specimen of the reinforcing structure A in comparison with a test specimen of the conventional structure designated by the dashed line in FIG. 4. The laminates with stiff aramid and steel cords in the 0° middle belt 14 (graphs 3 and 4) exhibit a high modulus and low elongation characteristic and therefore deform without reaching the threshold load virtually up to the failure point. The threshold load is, however, reached in a reinforcing structure having a middle ply 14 made of either nylon cord or PET cord at approximately 7 or 8% strain.

Also, it takes a much higher load to cause failure in the aramid cord and the wire strand reinforced three-ply test specimen structure (graphs 3 and 4) than in the conventional +23°/−23° two-ply test specimen structure. The load necesary to cause failure in the nylon cord and PET cord reinforced three-ply test specimen structures (graphs 1 and 2) is also higher than the load needed for the conventional two ply test specimen structure.

The middle ply 14 can be made either of a single helically wound cord or a plurality of discrete cords. If a number of discrete cords are used, these are generally embedded in a rubber matrix conventionally called a belt, which is wrapped around the inner ply. The adjoining ends of the belt are secured together in a splice zone. Of course, if a single helically wound cord were to be used, it could be coated with rubber if desired.

If a plurality of cords are used, the range of ends per inch of cord material in the 0° middle ply depends on the diameter of the cord and the spacing between the cords. In one preferred embodiment, the cord diameter is approximately 0.027 (0.0686) inches (cm.) and the spacing between the cords is also approximately 0.027 (0.0686) inches (cm.). Thus, 20 ends per inch are used.

Generally, in passenger car tires, sixteen to twenty four ends per inch can be provided for the cord material of the 0° middle ply. On truck tires, the number of ends per inch is considerably less, e.g. nine, for example, since the cord material needs to be considerably thicker in truck tires.

The cord material of the inner and outer belts 10, 12 can also have an end count of between sixteen and twenty four if desired, depending on the diameter of the cord and the spacing between the cords.

The cord of the middle ply 14 can be made of a plurality of strands although a monofilament of the correct diameter could also be used. For example, monofilament cords of various plastic materials are available in a diameter of approximately 0.027 (0.0686) inches (cm.).

With reference now to FIG. 5, a cyclic load is illustrated on a conventional +23°/−23° ply test specimen structure (graph line with empty circles) and the +23°/0°/−23° reinforcing test specimen structure of the present invention (graph line with filled circles). It can be seen that a considerably higher maximum cyclic load can be imposed on a test specimen of the reinforcing structure of the present invention before the threshold load is reached at any number of cycles in comparison to the conventional +23°/−23° ply structure. That is, the inclusion of the 0° middle ply 14 between the first and second, or inner and outer, plies 10, 12 allows a substantial increase in the threshold load thereby elevating the threshold stress level for the semi-infinite fatigue life of the reinforcing structure A. Even at any given maximum stress above the threshold load, the presence of the 0° middle ply results in a considerable increase in the fatigue lifetime of a test specimen of the laminate or the reinforcing structure A.

Under cyclic tension a test specimen the +23°/0°/−23° structure with nylon cord as the 0° ply reinforcement exhibits a substantially higher threshold stress level for semi-infinite fatigue life than does a test specimen of the conventional structure. At any given maximum stress over the threshold load, the inclusion of a 0° middle ply results in a considerable increase in the fatigue lifetime for the composite belt structure as a whole.

In addition to reducing strain gradients near the edge of the laminate, the inclusion of the 0° middle ply or belt allows an increase of the cord angle for the first and second belts 10, 12 from 23° to 45° without a lowering of the overall laminate modulus and strength below those of a conventional tire belt structure. The increase of the cord angle of the upper and lower belt plies also results in a decrease of interply shear strain. Along with a superior resistance to belt edge separation, a tire with the belt package of the present invention, particularly a +45°/0°/−45° reinforcing structure, is expected to show little sacrifice of lateral stiffness (which is determined by the shear and circumferential moduli of the belt) in comparison with a conventional tire.

As a general rule, the 45° ply will maximize the in-plane shear modulus of the belt and the 0° ply will maximize the circumferential modulus of the belt for the cord-rubber composite reinforcing structure A of a tire according to the present invention.

Thus, another belt laminate construction according to the present invention is the +45°/0°/−45° three-ply structure designated by the numeral 5 in FIG. 4. This cord angle sequence appears to be advantageous because it does not alter the stiffness of the reinforcing structure A in comparison to the conventional +23°/−23° construction. In other words, a +23°/0°/−23° construction results in a stiffer reinforcing structure and hence a tire with a stiffer belt structure than the conventional +23°/−23° construction. Also, a +45°/0°/−45° construction of the belt reduces the Poisson's ratio mismatch that even a +23°/0°/−23° construction has with the 90° carcass ply and this should lead to an increase in fatigue resistance along with an increase in the threshold load. In a test specimen of the +45°/0°/−45° ply structure, the threshold load is at around 13% strain and failure occurs at around 22% strain. The +45°/0°/−45° ply structure fairly well parallels the static load response of a test specimen of a +23°/−23° conventional ply structure in static load, as is evident from its curve indicated by the numeral 5 in FIG. 4, but will have a much higher resistance to fatigue.

The addition of a 0° middle belt or ply to the conventional tire reinforcing structure, however, results in an up to two-fold increase of gross fracture load depending upon the strength of the 0° ply reinforcement.

Cyclic loading of a +45°/0°/−45° belt structure having a nylon cord as the 0° ply reinforcement also exhibits substantially higher threshold stress levels for semi-infinite fatigue life as compared with conventional belt structures.

It has been found that the improvement in fracture resistance of the reinforcing structure A having a 0° middle belt 14 will also be observed under the constraint of a conventional tire carcass ply, such as the carcass ply 36 of FIG. 1 which has a plurality of spaced parallel cords oriented at 90° to the midcircumferential centerplane 44 of the tire B.

With reference now to FIG. 6, a cyclic load comparison is shown between a test specimen of a conventional tire structure having a 90° carcass ply bonded to a +23°/−23° tread reinforcing belt structure designated by the numeral 1, and test specimens of a 90° carcass ply with a +23°/0°/−23° and a +45°/0°/−45° tread reinforcing structure according to the present invention, designated by the numerals 2 and 3, respectively. It can be seen that the maximum load and the number of cycles at that maximum load is greatly increased by both constructions 2 and 3 which utilize the 0° middle belt or ply according to the present invention.

The behavior of the tire belt is therefore not altered by the constraint of a carcass ply. The threshold load is increased by constructions 2 and 3 according to the present invention, as shown in FIG. 6.

The reinforcing structure A of the present invention can be used on vehicle tires of all types. For passenger car tires, nylon, PET cord or a like material appear to be the most suitable for the middle ply 14. For truck tires, the cord material of the middle ply could comprise a high extension wire made of a suitable metal, which could allow approximately a 7% elongation but is considerably stronger than nylon or PET. Such metals could include soft steel as well as various steel alloys or alloys of other metals.

In plastic material, such as nylon or PET cord, heat shrinkage would normally occur during the tire cure proces, and such heat shrinkage would add a compression load on the tire. But, such heat shrinkage can be avoided by heat setting the cord before installation.

As noted in FIGS. 4 and 5, the inner and outer plies are preferably made from a wire strand material which is encapsulated in a rubber matrix. It should, however, be recognized that other high strength materials, such as aramid fiber, glass fiber and carbon fiber could be used instead of a wire material.

Although cord angles of +23°/−23° and +45°/−45° were discussed above for the first and second belts 10, 12, it should be recognized that any cord angles between 5° and 60° could be used. Generally speaking, however, the cord angles will range between 23° and 45°.

Figure 2:
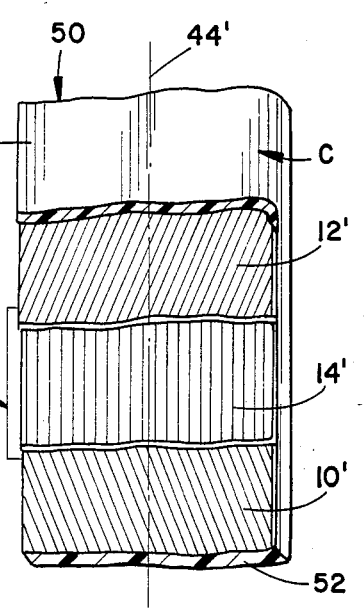
FIG. 2 is a top plan view, with parts broken away, of a belt provided with the reinforcing structure of the present invention.

With reference now to the alternate embodiment of FIG. 2, the invention is there shown as being used in a belt. For ease of illustration and appreciation of this alternative, like components are illustrated by like numerals with a primed (′) suffix, and new components are identified by new numerals.

In this FIGURE, it can be seen that a reinforcing structure A′ having first, second and third plies (10′, 12′, 14′) is used in a belt construction C which is bisected by a midcircumferential centerplane 44′. Such a belt C could be used as a conveyor belt, a power transmission belt, or the like. Generally speaking, such a belt C includes a belt body 50 made out of a natural or man-made rubber compound. A first belt portion 52 lays underneath the reinforcing structure A′ and a second belt portion 54 overlays the reinforcing structure. If desired, the reinforcing structure A′ could extend laterally to the edges of the belt C or could be narrower.

The subject invention therefore provides a reinforcing belt structure for rubber articles, such as tires, conveyor belts, or the like, which minimizes the parameters that would lead to edge cracking and subsequent delamination in such structures. These problems are minimized by reducing the strain gradients near the lateral edges of the reinforcing belt structure and by having the adjacent belts or plies with values of Poisson's ratio that are close to each other. Also, the positioning of a 0° middle belt between the two adjacent but oppositely angled belts of the belt structure also strengthens the interply region between the belt plies. It has been found that under uniaxial tension, the 0° middle belt has a relatively uniform deformation capability across its width and exhibits no excessive mismatch of Poisson's ratio in relation to the upper and lower belt plies as long as they have cord angles of less than 60°.

The invention has been described with reference to preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A reinforcing structure for a resilient rubber article, comprising:
   a first annular ply disposed in the article, said first ply including a plurality of parallel cords which are disposed at an angle with respect to the midcircumferential centerplane of the article;
   a second annular ply disposed in the article and positioned radially outwardly of said first ply, said second ply including a plurality of parallel cords which are disposed at an angle with respect to said midcircumferential centerplane of the article in a direction opposite to the direction of said cords of said first ply; and,
   a single third annular ply disposed in the article and positioned between said first and second plies and bonded thereto, said third ply including a plurality of parallel cords which form a 0° angle with respect to said midcircumferential centerplane of the article, said third ply cords having a diameter no greater than the diameters of said first and second ply cords, said third ply has a lower tensile strength and is more extensible than said first and second plies.

2. The reinforcing structure of claim 1 wherein the article is a tire and said first, second and third plies are adjacent tread reinforcing belts positioned in said tire, wherein said third ply increases the fatigue resistance of the structure.

3. The reinforcing structure of claim 2 wherein said cord angles of said first and second belts range between +5 and +60 degrees and −5 and −60 degrees, respectively.

4. The reinforcing structure of claim 2 wherein said cord angles of said first and second belts range between +23 degrees and +45 degrees and −23 degrees and −45 degrees, respectively.

5. The reinforcing structure of claim 1 wherein the article is a passenger tire and said third ply cords have an end count of approximately 16 to 24 ends per inch (2.54 cm.).

6. The reinforcing structure of claim 1 wherein said first and second ply cords are made from a material selected from the group consisting of steel wire, aramid fiber, glass fiber and carbon fiber and wherein said third ply cords are made from a material selected from the group consisting of nylon, polyethylene terpthalate, aromatic polyamide, and metal wire.

7. The reinforcing structure of claim 1 wherein said third ply cords are made of a material having a lower tensile strength than said first and second ply cords.

8. The reinforcing structure of claim 1 wherein the rubber article is a resilient belt.

9. The reinforcing structure of claim 8 wherein said belt is a power transmission belt.

10. The reinforcing structure of claim 8 wherein the belt is a conveyor belt.

11. A pneumatic tire comprising:
a tread portion and a pair of integral sidewalls; and,
a tread reinforcing structure positioned in the tire underneath said tread portion, comprising:
an annular first belt reinforcement member having a cord construction such that a plurality of spaced adjacent cords thereof are parallel to each other and are disposed at an angle of $+\alpha$ degrees with respect to a midcircumferential centerplane of said tire;
an annular second belt reinforcement member positioned radially outwardly of said first belt, said second belt having a cord construction such that a plurality of spaced adjacent cords thereof are parallel to each other and are disposed at an angle of $-\alpha$ degrees with respect to said midcircumferential centerplane of said tire; and
an annular third belt reinforcement member positioned between said first and second belts and bonded thereto, said third belt having a cord construction such that a plurality of spaced adjacent cords thereof are parallel to each other and are disposed at an angle of 0° with respect to said midcircumferential centerplane of the tire, said cords of said third belt being made from a material having a lower tensile strength than the material from which said cords of said first and second belts are made, said third ply has a lower tensile strength and is more extensible than said first and second plies, wherein said third belt increases the fatigue resistance of said structure and wherein said first and third belts are of approximately equal width, and said second belt is no wider than said first and third belts.

12. The tire of claim 11 wherein said angles of range from 5 to 60 degrees.

13. The tire of claim 12 wherein $\alpha$ is approximately 23 degrees.

14. The tire of claim 12 wherein $\alpha$ is approximately 45 degrees.

15. The tire of claim 11 wherein said first, second and third belts are of approximately equal thickness.

16. The tire of claim 11 wherein said first and second belt cords are made from a material selected from the group consisting of steel wire, aramid fiber, glass fiber and carbon fiber, and wherein said third belt cords are made from a material selected from the group consisting of nylon, polyethylene terpthalate, aromatic polyamide and metal wire.

17. The tire of claim 11 wherein said third belt cords have a diameter no greater than the diameter of said first and second belt cords.

18. The tire of claim 11 wherein the cords of said third belt have an end count of between approximately 9 and approximately 24.

19. A reinforcing structure for a rubber article comprising:
a first annular belt reinforcement member disposed in the article, said first belt having a cord construction including a plurality of spaced parallel cords, said cords being disposed at an angle between 5 degrees and 60 degrees with respect to a midcircumferential centerplane of the article;
a second annular belt reinforcement member disposed in the article and positioned radially outwardly of said first belt, said second belt having a cord construction including a plurality of spaced parallel cords, said second belt cords being disposed at the same angle as, but in an opposite direction from, said first belt cords; and,
a single third annular belt reinforcement member disposed in the article and positioned between said first and second belt members and bonded thereto, said third belt member having a cord construction with a plurality of spaced parallel cords which are disposed at an angle of 0° with respect to said midcircumferential centerplane of the article, said cords of said third belt being made from a material having a lower tensile strength than the material from which the cords of said first and second belt members are made, said third ply has a lower tensile strength and is more extensible than said first and second plies, wherein said third belt member cooperates with said first and second belt members to increase the fatigue resistance of the structure.

20. The reinforcing structure of claim 19 wherein said first, second and third belt members are approximately equal in thickness and wherein said third belt member is no wider than said first belt member.

21. The reinforcing structure of claim 19 wherein said first and second belt member cords are made from a material selected from the group consisting of steel wire, aramid fiber, glass fiber and carbon fiber and wherein said third belt member cords are made from a material selected from the group consisting of nylon, polyethylene terpthalate, aromatic polyamide and metal wire.

22. The reinforcing structure of claim 19 wherein the article is a pneumatic tire and said first, second and third belt members are tread reinforcing belts in said tire.

23. The reinforcing structure of claim 22 wherein the cords of said third belt have an end count of between approximately 9 and approximately 24.

24. The reinforcing structure of claim 19 wherein said third ply cords have a diameter no greater than the diameters of said first and second ply cords.

* * * * *